United States Patent [19]
Chung et al.

[11] Patent Number: 5,675,797
[45] Date of Patent: Oct. 7, 1997

[54] GOAL-ORIENTED RESOURCE ALLOCATION MANAGER AND PERFORMANCE INDEX TECHNIQUE FOR SERVERS

[75] Inventors: Jen-Yao Chung; Donald Francis Ferguson, both of Yorktown Heights, N.Y.; Christos Nicholas Nikolaou, Heraklion Crete, Greece; James Zu-Chia Teng, San Jose, Calif.; George Wei Wang, Yorktown Heights, N.Y.

[73] Assignee: International Business Machines Corporation, Armonk, N.Y.

[21] Appl. No.: 248,122

[22] Filed: May 24, 1994

[51] Int. Cl.$^6$ .................................................. G06F 12/08
[52] U.S. Cl. .................. 395/674; 395/456; 395/445; 395/497.02; 395/497.04
[58] Field of Search .................................... 395/650, 425, 395/674, 497.02, 456, 445, 497.04

[56] References Cited

U.S. PATENT DOCUMENTS

| | | | |
|---|---|---|---|
| 4,422,145 | 12/1983 | Sacco et al. | 364/300 |
| 4,463,424 | 7/1984 | Mattson et al. | 364/300 |
| 4,503,501 | 3/1985 | Coulson et al. | 364/200 |
| 4,845,710 | 7/1989 | Nakamura et al. | 370/110.1 |
| 4,947,319 | 8/1990 | Bozman | 364/200 |
| 5,046,039 | 9/1991 | Ugajin et al. | 364/900 |
| 5,068,784 | 11/1991 | Kishino et al. | 395/275 |
| 5,093,912 | 3/1992 | Dong et al. | 395/650 |
| 5,394,531 | 2/1995 | Smith | 395/425 |

FOREIGN PATENT DOCUMENTS 61-101851  5/1986  Japan.

OTHER PUBLICATIONS

Hospodor, Andy, Hit Ratio of Caching Disk Buffers, Compcon Spring '92 IEEE Comp. Society Int'l Conference, 1992.

Casas et al, A Buffer Management Model for Use in Predicting Overall Database System Performance, Data Engrg 1989 5th Int'l Conf.

Dan et al, Database Access Characterization for Buffer Hit Prediction, Data Engineering, 1993 9th Int'l Conference.

Ferguson et al, Satisfying Response Time Goals in Transaction Processing, Parallel & Distributed Info Systems, 1993 Int'l Conference.

Nicola, NVR S. DB2 Buffer Pools: The Performance Imperative. Database Programming & Design, Dec. 1992 V:5 N:12 p. 43(5).

Primary Examiner—Lucien U. Toplu
Attorney, Agent, or Firm—Heslin & Rothenberg, P.C.

[57] ABSTRACT

A resource allocation manager and technique for servers within a computer system. Resources are initially allocated to servers and in order to enhance system performance, resources are reallocated based on a minimization of the maximum performance index. In one example, the server with the largest performance index is allocated additional resources and the server with the smallest performance index loses some of its resources.

4 Claims, 5 Drawing Sheets

1

GOAL-ORIENTED RESOURCE ALLOCATION MANAGER AND PERFORMANCE INDEX TECHNIQUE FOR SERVERS

TECHNICAL FIELD

This invention relates in general to database management systems and, in particular, to enhancing performance of a database management system by managing resource allocation within the system.

BACKGROUND ART

The performance of database management systems is very important and it is affected by many factors. In relational database management systems, the performance is greatly influenced by the effective use of semiconductor memory as buffer pool space. This is true for both on-line transaction processing and decision support/query processing. If the probability of finding a requested page or buffer in the buffer pool is high, then the expected transaction response time decreases because of lower I/O delays. Furthermore, high buffer hit probability lowers disk contention which means that the I/Os that occur due to buffer misses can be serviced more quickly. Additionally, high buffer hit probability reduces CPU system overhead due to I/O pathlength and interrupt processing. This effectively decreases the pathlength per transaction and increases maximum transaction throughput for a given processor configuration.

For a fixed amount of storage, buffer management algorithms dramatically determine the effectiveness of database buffering. Algorithms are evaluated by the underlying performance metrics. In order to user performance objectives, buffer managers of database management systems often support the definition of multiple buffer pools. The fixed total storage for buffers is chosen based on the system capacity and is partitioned into sets of logical buffer pools. The size of each pool is chosen to provide differing levels of service to different databases accessed. However, by statically selecting a size for each buffer pool, a multiple buffer pool environment is not always efficiently utilized. This is because requirements may change over time and therefore, the particular buffer size chosen for a particular pool may no longer be satisfactory.

Thus, a need exists for a technique and manager that periodically determines the requirements for particular buffer pools and dynamically adjusts the buffer pools based on the requirements.

SUMMARY OF THE INVENTION

The shortcomings of the prior art are overcome and additional advantages are provided through the provision of a method for managing allocation of resources in a computer system. Resources are allocated to a plurality of servers located within the computer system. A maximum performance index for the computer system is determined and one or more of the resources are reallocated to one or more of the plurality of servers such that the maximum performance index is minimized.

In one embodiment, the resources include buffers and the servers include buffer pools. In a further embodiment, in order to determine a maximum performance index for the computer system, a performance index for each of the plurality of servers is determined such that a plurality of performance indexes is obtained and from the plurality of performance indexes, the maximum performance index is selected.

In a further embodiment, in order to determine a performance index, an estimated getpage response time is determined and the estimated getpage response time is divided by a predetermined goal.

In yet a further embodiment, the estimated getpage response time is determined by computing a random access getpage hit ratio function, determining an average time required for moving a page of data from a direct access storage device to physical storage such that a value for DELAY is obtained and subtracting the random access getpage hit ratio function from a value of one and multiplying the result by DELAY.

In one embodiment, in order to reallocate the resources, one or more of the resources are removed from at least one of the servers and the one or more resources are added to at least one other of the servers.

In another embodiment, a method for managing allocation of resources in a computer system having a plurality of servers is provided. Each of the servers has an initial allocation of resources. A determination is made as to which of the plurality of servers has a maximum performance index and which has a minimum performance index. Resources are removed from the server having the minimum performance index and are added to the server having the maximum performance index.

In yet another embodiment of the invention, a method for managing allocation of resources in a computer system having a plurality of servers is provided. Each of the servers has a size value associated therewith. A first performance index is calculated for each server using its size value minus a predefined number of resources to be exchanged, such that a plurality of first performance indexes is provided. From the plurality of first performance indexes, a minimum server is determined by selecting a minimum performance index. A second performance index is also calculated for each server using its size value plus the predefined number of resources to be exchanged, such that a plurality of second performance indexes is provided. From the plurality of second performance indexes, a maximum server is determined by selecting a maximum performance index. A third performance index is calculated for the minimum server using its size value, and a fourth performance index is calculated for the maximum server using its size value. The size value of the maximum server is increased when a maximum value of the third and fourth performance indexes is greater than a maximum value of the minimum performance index and the maximum performance index. Also, the size value of the minimum server is decreased when a maximum value of the third and fourth performance indexes is greater than a maximum value of the minimum performance index and the maximum performance index. The calculations of the first and second performance indexes, the determinations of the maximum and minimum servers, the calculations of the third and fourth performance indexes and the increasing and decreasing of server size values, described above, are repeated until a maximum value of the third and fourth performance indexes is not greater than a maximum value of the minimum performance index and the maximum performance index. Additionally, resources are removed from each server having a decreased size value and added to each server having an increased size value.

In another aspect of the invention, a resource allocation manager is provided. The resource allocation manager includes means for allocating resources to a plurality of servers located within a computer system, means for determining a maximum performance index for the computer system and means for reallocating one or more of the resources to one or more of the plurality of servers such that a maximum performance index is minimized.

In another aspect of the invention, a resource allocation manager for managing allocation of resources in a computer system having a plurality of servers is provided. Each of the servers has an initial allocation of resources. The manager includes means for determining which of the servers has a maximum performance index and which has a minimum performance index. Further, means are included for removing resources from the server having the minimum performance index and adding resources to the server having the maximum performance index.

The resource allocation manager and technique of the present invention advantageously allows for the dynamic adjustment of the sizes of the servers and the allocation of resources, such that system performance is enhanced. In one example, the performance of each server is monitored and the size of one or more servers and the allocation of resources are periodically changed to improve performance satisfaction. Allocation of resources is adjusted by adding or subtracting resources from the server based upon how the server and/or the system is functioning.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

Figure 1:
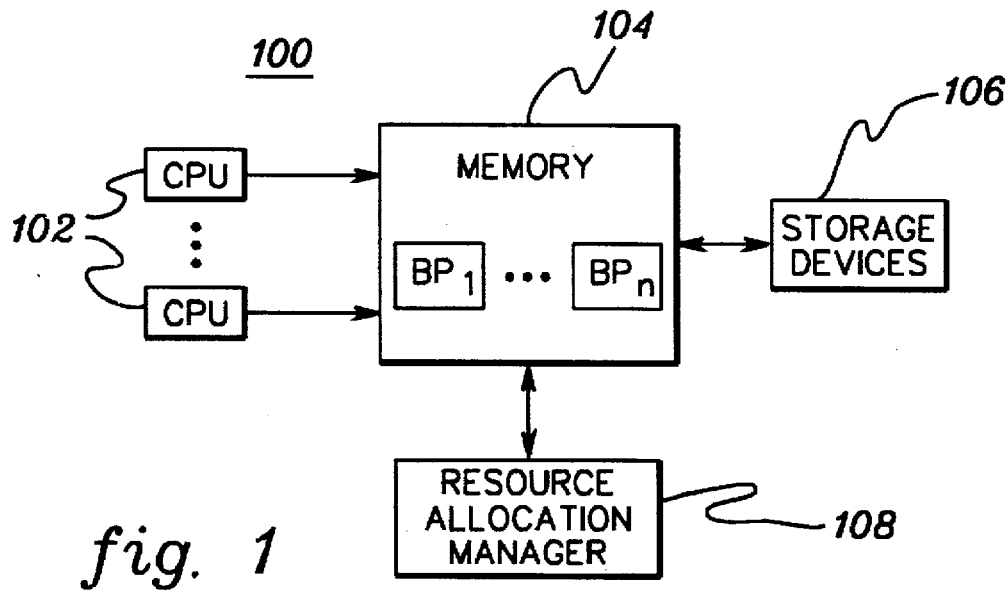
FIG. 1 depicts one example of a computer system including the resource allocation manager of the present invention.

Depicted in FIG. 1 is one example of a block diagram of a computer system incorporating the resource allocation manager of the present invention. Computer system 100 is, for example, an ES 9000 or an RS 6000 Model 980 offered by International Business Machines Corporation and its main hardware components include, for instance, one or more central processing units (CPUs) 102, a memory unit 104, one or more storage devices 106 and a resource allocation manager or memory controller 108. Each of these components is described further below.

In general, central processing units 102 contain the sequencing and processing facilities for instruction execution, interruption action, timing functions, initial program loading and other machine related functions. Central processing units 102 are coupled to memory 104, which is directly addressable and provides for high speed processing of data by the CPUs.

In one embodiment, memory 104 may include a central store and an expanded store. The central store is generally faster and more expensive than expanded store. Further, in one example, memory 104 includes a number of servers such as, for instance, a number of buffer pools, denoted $BP_1$, ..., $BP_n$, for the logical partitioning of buffers. As used herein, each buffer includes a 4 k page of memory 104. In one specific example, memory 104 includes 1,000–500,000 buffers divided among 1–60 buffer pools. At any given time, each buffer pool has a predefined size, referred to as $SIZE_1$, ... $SIZE_n$. The size of a buffer pool will vary over time. Buffer pools are typically used for temporarily storing pages of data. In particular, in a relational database management system, such as DB2, offered by International Business Machines Corporation, buffer pools are used to temporarily store table spaces and/or indexes.

Memory 104 is coupled to storage devices 106. Data is transferred from memory 104 to storage devices 106 and from the storage devices back to memory. In one embodiment, the data transferring operation associated with storage devices 106 is synchronous to the execution of instructions on the CPU and thus, it is advantageous to perform this operation as fast as possible.

Memory 104 is also coupled to resource allocation manager 108. Resource allocation manager 108 monitors the performance of system 100 and uses the technique of the present invention to dynamically expand or contract the size of the buffer pools depending on the workload within system 100 and the performance of the system. In particular, as described in detail below, resource allocation manager 108 will add buffers to a particular buffer pool and subtract buffers from another buffer pool, thereby increasing or decreasing the size of the buffer pools, depending on system workload and performance.

In accordance with the principles of the present invention, the resource allocation manager is provided for dynamically managing and adjusting buffer pools within a computer system. In particular, as described in detail below, the technique of the present invention allows for the dynamic adjustment of buffer pool sizes to minimize the maximum performance index of the system and to balance the performance index values among all the buffer pools within the system. One example of a resource allocation management technique is described in detail with reference to FIGS. 2 and 3a–3d.

Figure 2:
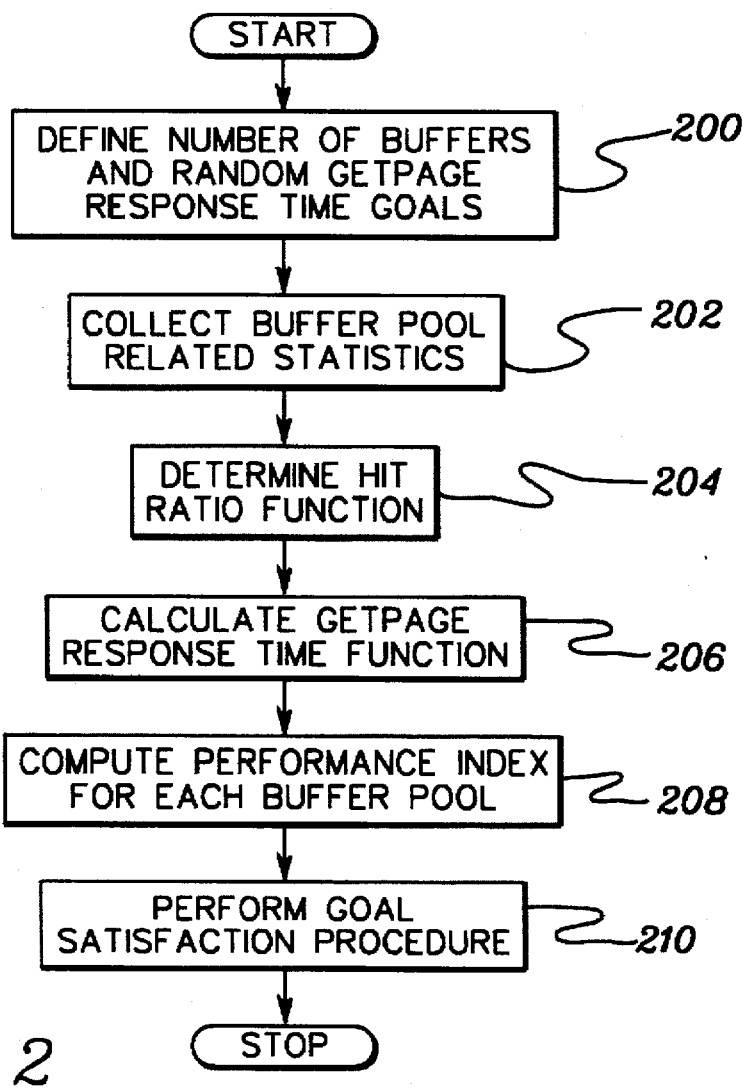
FIG. 2 illustrates one embodiment of the flow associated with a resource allocation management technique, in accordance with the principles of the present invention.

Referring to FIG. 2, initially, the user defines the total number of buffers to be allocated within the computer system and the random getpage response time goal for each buffer pool, STEP 200, "DEFINE NUMBER OF BUFFERS AND RANDOM GETPAGE RESPONSE TIME GOALS." In accordance with the principles of the present invention, in one embodiment, the total number of buffers within the system is not changed as a result of the present invention. (However, in another embodiment, the total number of buffers may be altered.) As described above, in one example, the number of buffers equals 1,000–500,000.

A random getpage response time goal is a predefined goal reflecting the desired goal associated with random page requests. The random getpage goals are referred to herein as $RGOAL_1$, ..., $RGOAL_N$. A typical goal may be, for example, eighty percent (80%) in which 80% of the time random memory page requests are satisfied without physical I/O to access the data.

Subsequent to initializing the number of buffers and the random getpage response time goals, statistics related to each buffer pool are periodically collected, STEP 202 "COLLECT BUFFER POOL RELATED STATISTICS." In one example, these statistics are provided by a report within computer system 100, such as, for instance, a DB2 report, and include the buffer pool sizes, described above, hit ratios and average page moving delay, described below. Hit ratio indicates a ratio between hits and total number of accesses of pages in physical memory. (That is, Hit Ratio=hits/(hits+misses).) Each time a program references a page and the page is within physical memory, a hit occurs. However, when the page is not within physical memory, then a miss occurs. Average page moving delay refers to the average time required for moving a page from the direct access storage devices (DASD) to the physical storage.

The statistics collected from the computer system are used in calculating a number of functions, which are then used in a goal satisfaction procedure of the resource allocation management technique of the present invention, as described below. One of the functions to be calculated is a random access getpage hit ratio function used to formulate the relationship between the different buffer pool sizes and the corresponding buffer pool hit ratios, STEP 204 "DETERMINE HIT RATIO FUNCTION."

In one embodiment, the hit ratio function $HIT_i(SIZE)$ for a buffer pool ($BP_i$) having a size (SIZE) can be approximated by the following equation:

$$HIT_i(SIZE)=1-a\times SIZE^b$$

where a and b are constants. If hit ratios $HIT_i(size_1)$ and $HIT_i(size_2)$ are collected for two different sizes, $size_1$ and $size_2$, for the same buffer pool, then a system of linear equations may be derived for a and b and the logarithmic function can be applied to the previous equation. For example, $$b = \frac{\ln(1-HIT_i(size_2)) - \ln(1-HIT_i(size_1))}{\ln size_2 - \ln size_1}$$

$$a = \frac{1-HIT_i(size_1)}{e^{b\times \ln size_1}}$$

Another function to be calculated is a random getpage response time function used to formulate the relationship between the buffer pool hit ratios and the response time of the random getpage requests, STEP 206 "CALCULATE GETPAGE RESPONSE TIME FUNCTION." In one example, for a buffer pool ($BP_i$) having a particular size (SIZE) and ratio function ($HIT_i$), the response time function ($RT_i$) may be expressed as follows:

$$RT_i(SIZE)=(1-HIT_i(SIZE))\times DELAY+HIT_i(SIZE)\times 0$$

where DELAY is the average time required for moving a page from the direct access storage devices (DASD) to the physical storage. If the requested page is in the buffer pool, then the delay time (i.e., DELAY) is assumed to be negligible, i.e., zero.

Using the response time function just computed, a performance index is calculated for each buffer pool, STEP 208 "COMPUTE PERFORMANCE INDEX FOR EACH BUFFER POOL." In one embodiment, the performance index ($PI_i$) is defined as the estimated getpage response time divided by a random getpage response time goal, as shown by the equation listed below:

$$PI_i(SIZE)=RT_i(SIZE)/GOAL_i$$

In the above equation, $GOAL_i$ is defined as follows: $GOAL_i = (1-RGOAL_i)\times DELAY+RGOAL_i\times 0$ where RGOAL is the random getpage goal, described above.

If the performance index is less than or equal to 1, then the performance goal is being met for that particular buffer pool.

The smaller the value, the better the performance. The value of the performance index can be reduced by increasing the buffer pool size and can be increased by decreasing the buffer pool size. As described herein, the goal satisfaction procedure of the present invention dynamically adjusts the buffer pool sizes to minimize the maximum performance index. That is, $$\min(\max(PI_1, PI_2, \ldots, PI_N)).$$

In particular, resources, such as buffers, are dynamically reallocated to servers, such as buffer pools, in order to minimize the maximum performance index.

Subsequent to computing the performance index for each buffer pool, a goal satisfaction procedure may be performed, in accordance with the principles of the present invention, STEP 210 "PERFORM GOAL SATISFACTION PROCEDURE." One embodiment of this technique is described below in detail with reference to FIGS. 3a–3d.

Figure 3A:
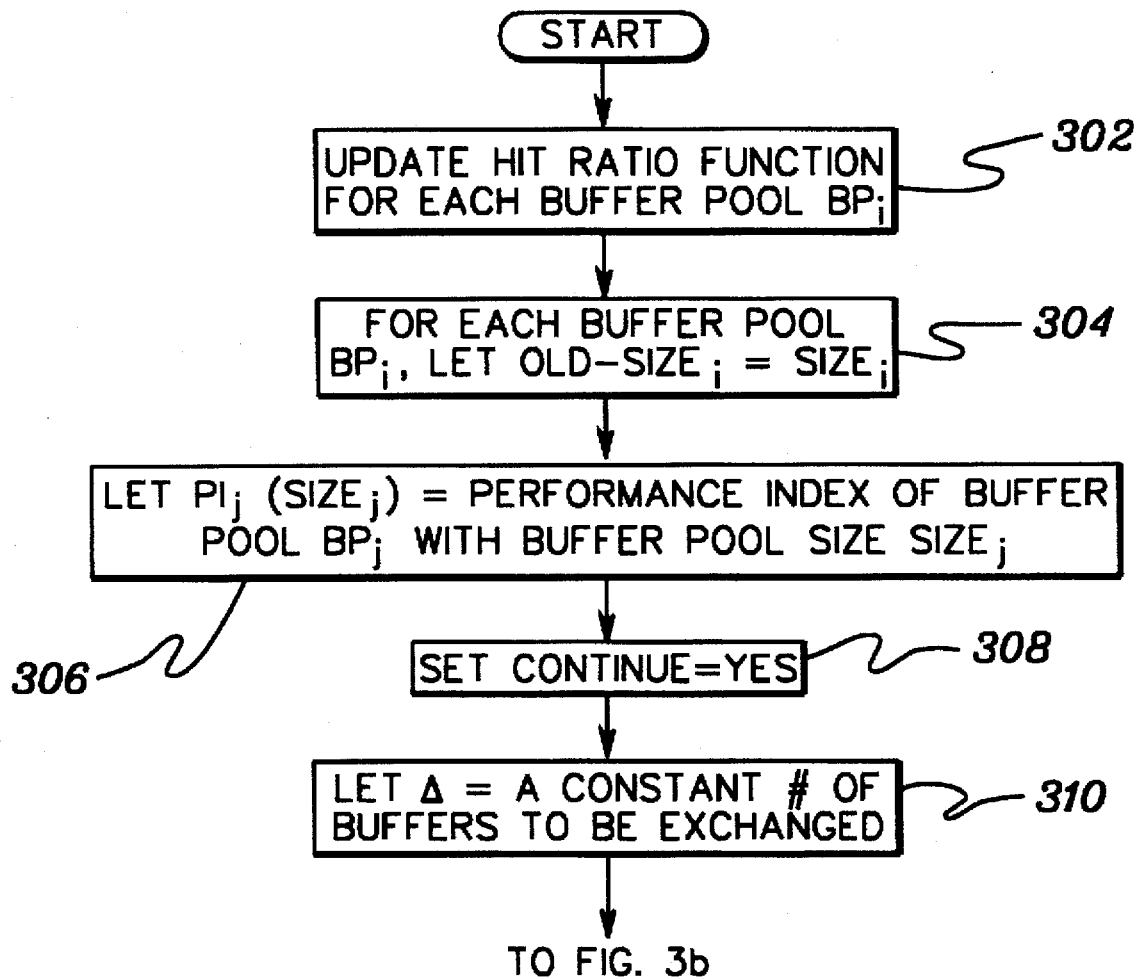
FIGS. 3a–3d depict one embodiment of a block diagram of a goal satisfaction procedure used in the resource allocation management technique of FIG. 2, in accordance with the principles of the present invention.

The goal satisfaction procedure is performed during a predetermined length of tuning intervals. During each tuning interval, the collected system statistics are used to update functions and to propose new sizes for the buffers pools, as described in detail herein. In particular, for each buffer pool, the hit ratio function is updated using the collected statistics, i.e, buffer pool sizes and hit ratios, STEP 302 "UPDATE HIT RATIO FUNCTION FOR EACH BUFFER POOL $BP_i$" (FIG. 3a). The manner in which a hit ratio function is determined is described in detail above.

The buffer pool with the largest performance index needs to be allocated more storage to improve its performance (i.e., decrease its performance index). Similarly, the buffer pool with the smallest performance index can be contracted to degrade its performance (i.e., increase its performance index). In order to exchange buffers to improve system performance, the iterative technique described below is used. It will be understood that this is only one technique and that variations to this technique may be used without departing from the spirit of the invention.

For each buffer pool from i=1 to n, a variable referred to as $OLD-SIZE_i$ is set equal to $SIZE_i$, STEP 304, "FOR EACH BUFFER POOL $BP_i$, LET $OLD-SIZE_i=SIZE_i$". In addition, for each buffer pool from j=1 to n, a variable referred to as $PI_j(SIZE_j)$ is set equal to the performance index of buffer pool $BP_j$ with buffer pool $SIZE_j$, STEP 306. Further, a variable referred to as CONTINUE is set equal to YES, STEP 308, and $\Delta$ is set equal to a constant number of buffers to be exchanged, STEP 310 "LET $\Delta$=A CONSTANT # OF BUFFERS TO BE EXCHANGED". In one embodiment, the constant number may be equal to, for example, 50. It will be apparent to those skilled in the art, however, that the constant number may be equal to a number other than 50.

Figure 3B:
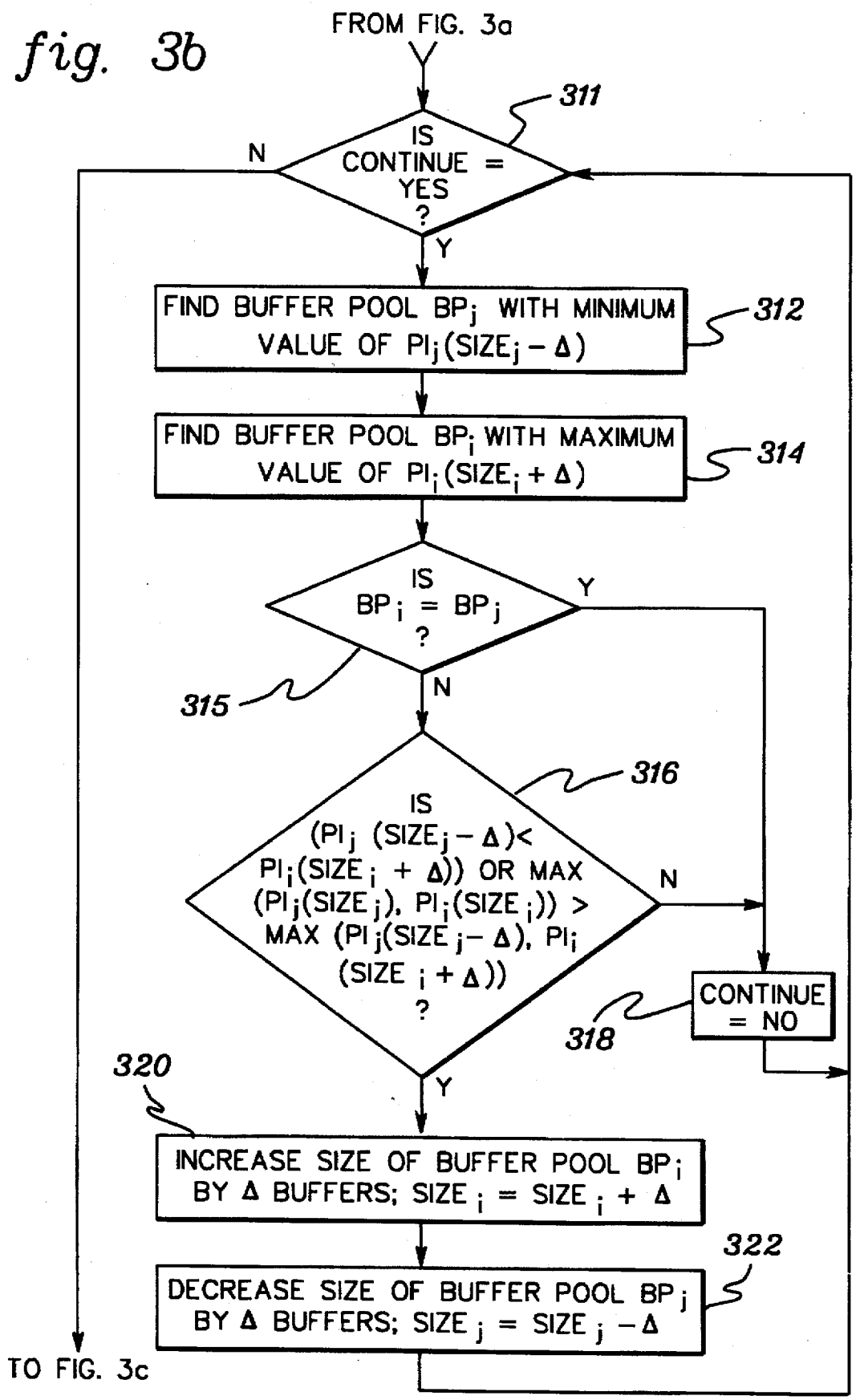

Thereafter, a determination is made as to whether CONTINUE is equal to YES, INQUIRY 311 "IS CONTINUE= YES?" (FIG. 3b). Since, at this stage, it was just set equal to YES, flow passes to STEP 312. Specifically, for each buffer pool, $\Delta$ is subtracted from its size and the performance index is recalculated. The buffer pool having the least performance index is labeled $BP_j$, STEP 312 "FIND BUFFER POOL $BP_j$ WITH MINIMUM VALUE OF $PI_j(SIZE_j-\Delta)$". Likewise, $\Delta$ is added to each buffer pool's size and then, the performance index is recalculated for each buffer pool. The buffer pool with the maximum performance index is labeled $BP_i$, STEP 314 "FIND BUFFER POOL $BP_i$ WITH MAXIMUM VALUE OF $PI_i(SIZE_i+\Delta)$".

Subsequently, a determination is made as to whether $BP_i$ is equal to $B_j$, INQUIRY 315. If $BP_i$ is not equal to $BP_j$, then flow passes to INQUIRY 316. In particular, a determination is made as to whether $PI_j(SIZE_j-\Delta)$ of buffer pool $BP_j$ is less than $PI_i(SIZE_i+\Delta)$ of buffer pool $BP_i$, or whether the maximum value of either $PI_i(SIZE_j)$ of buffer pool $BP_j$ or $PI_i(SIZE_i)$ of buffer pool $BP_i$ is greater than the maximum value of $PI_j(SIZE_j-\Delta)$ or $PI_i(SIZE_i+\Delta)$, INQUIRY 316. If the above condition is not met, or if $BP_i$ is equal to $BP_j$, then CONTINUE is set equal to NO, STEP 318 "CONTINUE= NO", and flow returns to INQUIRY 311 "IS CONTINUE= YES?" However, if the condition is met, then the size of buffer pool $BP_i$ is increased by $\Delta$ buffers, STEP 320 "INCREASE SIZE OF BUFFER POOL $BP_i$ BY $\Delta$ BUFFERS; $SIZE_i=SIZE_i +\Delta$." Further, the size of buffer pool $BP_j$ is decreased by $\Delta$ buffers, STEP 322 "DECREASE SIZE OF BUFFER POOL $BP_j$ BY $\Delta$ BUFFERS; $SIZE_j=SIZE_j-\Delta$."

Figure 3C:
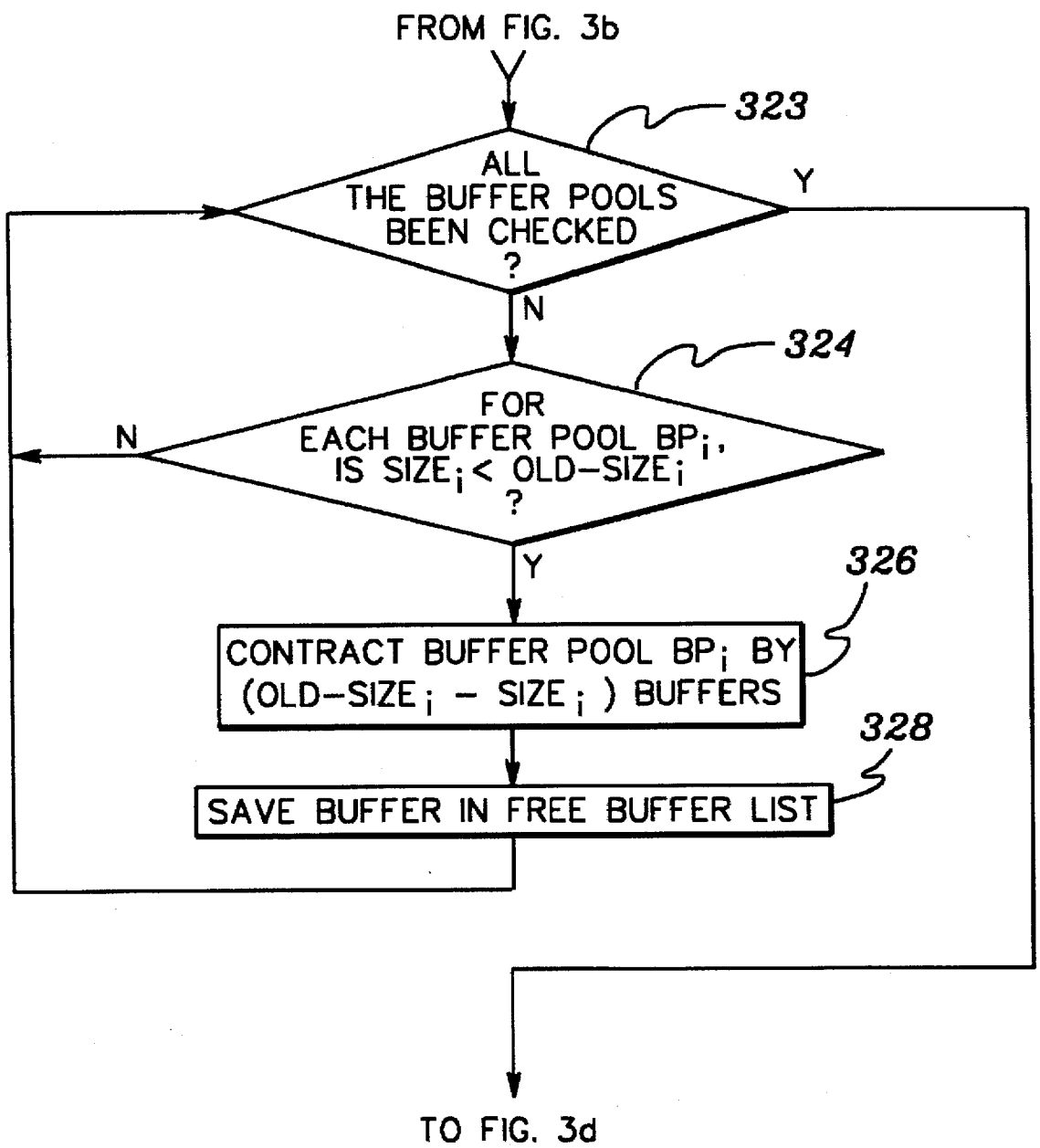

Subsequently, flow passes to INQUIRY 311 "IS CONTINUE 32 YES?" (FIG. 3b). Should CONTINUE=NO, then an inquiry is made into whether all the buffer pools have been checked, INQUIRY 323 "ALL THE BUFFER POOLS BEEN CHECKED?" (FIG. 3c). If all the buffer pools have not been checked, then for each buffer pool from i=1 to n, a determination is made as to whether $SIZE_i$ of $BP_i$ is less than $OLD-SIZE_i$, INQUIRY 324 "FOR BUFFER POOL $BP_i$, IS $SIZE_i<OLD-SIZE_i$?" If the current value of SIZE is less than the previous value of SIZE, then a number of buffers are subtracted from buffer pool $BP_i$, STEP 326 "CONTRACT BUFFER POOL $BP_i$ BY $(OLD-SIZE_i-SIZE_i)$ BUFFERS". The number of buffers to be subtracted is equal to the value of $OLD-SIZE_i-SIZE_i$. The buffers removed from buffer pool $BP_i$ are saved in a free buffer list in memory 104, STEP 328 "SAVE BUFFER IN FREE BUFFER LIST".

Figure 3D:
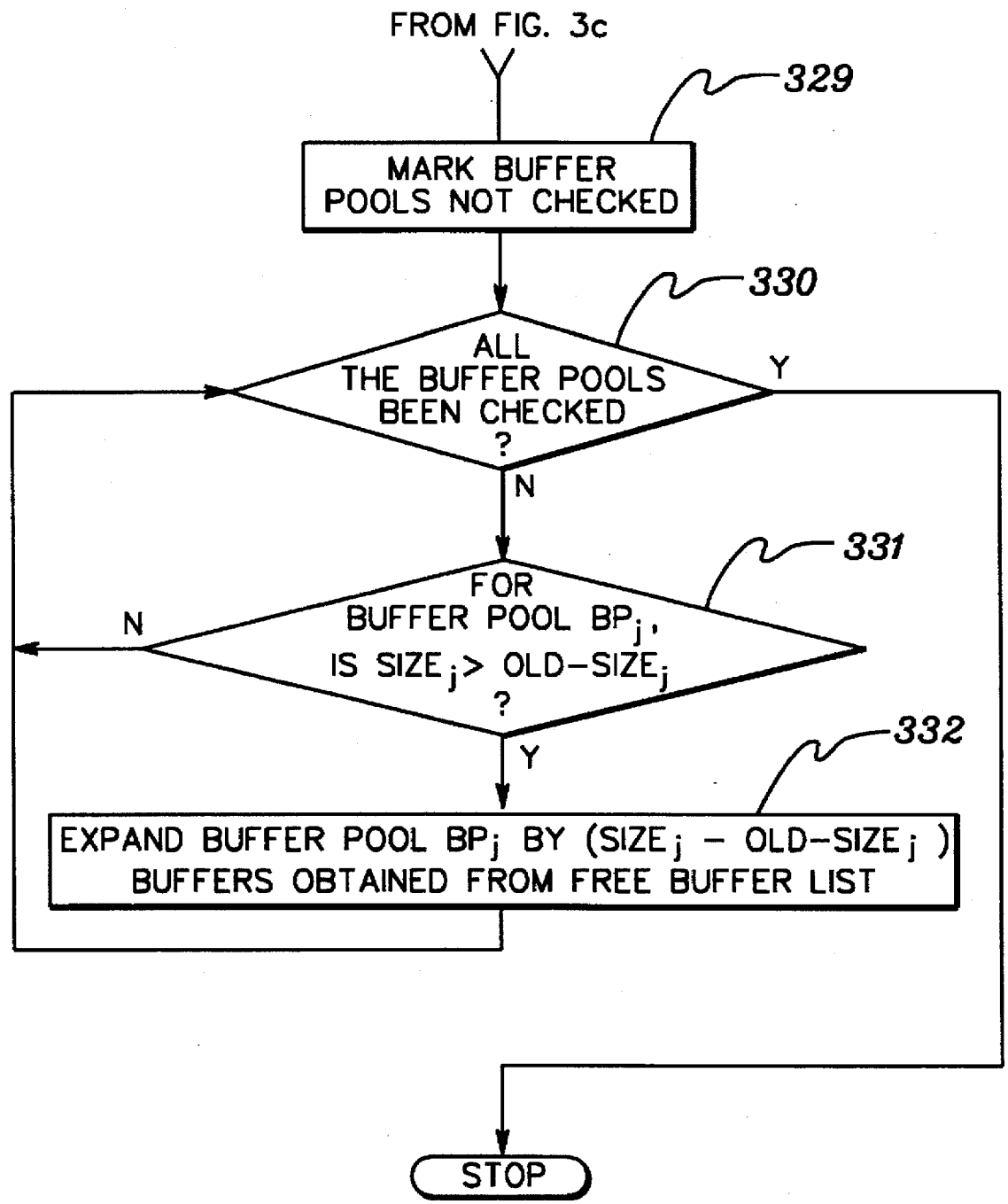

Thereafter, or if the current value of SIZE is greater than or equal to the previous value of SIZE, flow returns to INQUIRY 323 "ALL THE BUFFER POOLS BEEN CHECKED?" If all the buffer pools have been checked, flow passes to STEP 329 (FIG. 3d).

At this point, all of the buffer pool sizes are going to be checked again. Thus, the buffer pools are marked as not checked, STEP 329, and then an inquiry is made to determine if all of the buffer pools have been checked, INQUIRY 330. Since they were just marked as not checked, flow passes to INQUIRY 331. In particular, for each buffer pool from j=1 to n, a determination is made as to whether the current value of SIZE is greater than the previous value of SIZE, INQUIRY 331 "FOR BUFFER POOL $BP_j$, IS $SIZE_j>OLD-SIZE_j$?" Should the current value be greater than the old value, buffer pool $BP_j$ is expanded. In particular, buffer pool $BP_j$ is increased by $(SIZE_j-OLD-SIZE_j)$ buffers, which are obtained from the free buffer list, STEP 332.

Subsequent to expanding buffer pool $BP_j$ or if the current value of $SIZE_j$ is less than or equal to the previous value of $SIZE_j$, flow passes to INQUIRY 330, "ALL THE BUFFER POOLS BEEN CHECKED?" If all have been checked, then the goal satisfaction procedure is complete.

For further understanding of the inventive technique, one specific example of the technique of the present invention is illustrated below:

---

DEFINE NUMBER OF BUFFERS, STEP 200
 In a two buffer pool system: BP1 and BP2
 The total number of buffers: 4000
  SIZE1 is the size of BP1
  SIZE2 is the size of BP2
  SIZE1 + SIZE2 = 4000
DEFINE RANDOM GETPAGE RESPONSE TIME GOALS, STEP 200

GOAL1 is the goal of BP1: 80%, means 80% hit ratio
GOAL2 is the goal of BP2: 80%, means 80% hit ratio
DETERMINE HIT RATIO FUNCTION, STEP 204
 HIT1(SIZE1) is the hit ratio function for BP1
  $= 1 - a \times (SIZE1 ** b)$
  (** refers to "raised to the power of")
  Given, size__1 = 1000, hit__1 = 0.7 (70% hit), and
   size__2 = 3000, hit__2 = 0.8 (80% hit),
  the a and b can be derived by
  b = (ln(1 − hit__2) − ln(1 − hit__1)) / (ln(size__2) − ln(size__1))
  where ln(x)=y function calculates the natural logarithm of x
  x = 2.71828183 ** y
   = (ln(1−0.8) − ln(1−0.7)) / (ln(3000) − ln(1000))
   = −0.36907025
  a = (1 − hit__1) / (e ** (b × ln(size__1)),
   where e = 2.71828183
   = (1 − 0.7) / (e ** (−0.369070 × ln(1000)))
   = 3.8400069
 ==> HIT1(SIZE1) = 1 − 3.8400069 × (SIZE1 ** −0.36907025)
HIT2(SIZE2) is the hit ratio function for BP2
 $= 1 - a \times (SIZE2 ** b)$
 Given, size__1 = 1000, the hit__1 = 0.78
  (78% hit), and
   size__2 = 3000, the hit__2 = 0.88
  (88% hit),
 the a and b can be derived by
 b = (ln(1 − hit__2) − ln(1 − hit__1)) /
   (ln(size__2) − ln(size__1))
  = (ln(1−0.88) − ln(1−0.78)) / (ln(3000) − ln(1000))
  = −0.55172859
 a = (1 − hit__1) / (e ** (b × ln(size__1)),
   where e = 2.71828183
   = (1 − 0.78) / (e ** (−0.551729 × ln(1000)))
   = 9.94508388
 ==> HIT2(SIZE2) = 1 − 9.94508388 × (SIZE2 ** −0.55172859)
CALCULATE GETPAGE RESPONSE TIME FUNCTION, STEP 206, AND PERFORMANCE INDEX, STEP 208
 Assume the average time required to move a page from DASD to physical storage to be 1 unit of time,
 i.e. DELAY__miss = 1. If the requested page is in the buffer pool, the delay time is negligible, i.e.
 DELAY__hit = 0
 The response time function (RT1) for buffer pool BP1:
  RT1(SIZE) = probability(miss on the buffer pool)
       × DELAY__miss + probability(hit on the buffer pool) × DELAY__hit
      = (1 − HIT1(SIZE)) × 1 + HIT1(SIZE) × 0
      = 1 − HIT1(SIZE)
      = 1 − (1 − 3.8400069 × (SIZE1 ** −0.36907025))
      = 3.8400069 × (SIZE1 ** −0.36907025)
  GOAL1 = (1−80%) × 1 + 80% × 0 = 0.2
 Performance index (PI1) = RT1(SIZE)/GOAL1
      = RT1(SIZE)/0.2
      = 3.8400069 × (SIZE1 ** −0.36907025) / 0.2
      = 19.2000345 × (SIZE1 ** −0.36907025)
 The response time function (RT2) for buffer pool BP2:
  RT2(SIZE) = probability(miss on the buffer pool)
       × DELAY__miss + probability(hit on the buffer pool) × DELAY__hit
      = (1 − HIT2(SIZE)) × 1 + HIT2(SIZE) × 0
      = 1 − HIT2(SIZE)
      = 1 − (1 − 9.94508388 × (SIZE 2 ** −0.55172859)
      = 9.94508388 × (SIZE2 ** −0.55172859)
  GOAL2 = (1−80%) × 1 + 80% × 0 = 0.2
 Performance index (PI2) = RT2(SIZE)/GOAL2
      = RT2(SIZE)/0.2
      = 9.94508388 × (SIZE2 ** −0.55172859) / 0.2
      = 49.7254194 × (SIZE2 ** −0.55172859)

-continued

```
PERFORM GOAL SATISFACTION PROCEDURE, STEP 210
   We want to minimize the maximum performance index,
      i.e. min(max(PI1,PI2)
   For BP1, STEPS 304, 306
      SIZE_1, OLD_SIZE_1 = 1000
      PI_1 = 19.2000345 × (SIZE_1 ** -0.36907025)
   For BP2, STEPS 304, 306
      SIZE_2, OLD SIZE_2 = 3000
      PI_2 = 49.7254194 × (SIZE2 ** -0.55172859)
   constant number of buffers to be exchanged,
   Δ = 100, STEP 310. Following is a table
   showing the Performance Index for different buffer
   pool sizes:
```

| BP1 | | BP2 | |
| --- | --- | --- | --- |
| SIZE_1 | PI_1 | SIZE_2 | PI_2 |
| x900 | 1.559476 | 900 | 1.165839 |
| 1000 | 1.499999 | 1000 | 1.100000 |
| 1100 | 1.448152 | 1100 | 1.043651 |
| 1200 | 1.402386 | 1200 | 0.994732 |
| 1300 | 1.361563 | 1300 | 0.951759 |
| 1400 | 1.324828 | 1400 | 0.913269 |
| 1500 | 1.291519 | 1500 | 0.879505 |
| 1600 | 1.261210 | 1600 | 0.848739 |
| 1700 | 1.233216 | 1700 | 0.820819 |
| 1800 | 1.207473 | 1800 | 0.795338 |
| 1900 | 1.183617 | 1900 | 0.771963 |
| 2000 | 1.161421 | 2000 | 0.750423 |
| 2100 | 1.140695 | 2100 | 0.730492 |
| 2200 | 1.121277 | 2200 | 0.711981 |
| 2300 | 1.103032 | 2300 | 0.694732 |
| 2400 | 1.085841 | 2400 | 0.678609 |
| 2500 | 1.069604 | 2500 | 0.663495 |
| 2600 | 1.054233 | 2600 | 0.649292 |
| 2700 | 1.039651 | 2700 | 0.635912 |
| 2800 | 1.025789 | 2800 | 0.623280 |
| 2900 | 1.012590 | 2900 | 0.611328 |
| 3000 | 0.999999 | 3000 | 0.600000 |
| 3100 | 0.987970 | 3100 | 0.589243 |

```
INITIAL CONDITION, given
   BP1 with SIZE1 = 1000, PI1(1000) = 1.499999
   BP2 with SIZE2 = 3000, PI2(3000) = 0.600000
FIND BUFFER POOL BPj with MINIMUM VALUE OF
PIj(SIZEj - 100), STEP 312
   PI1(1000-100) = 1.559746
   PI2(3000-100) = 0.611328
   PI1(1000-100) > PI2(3000-100), BP2 has the
      MINIMUM value of PI => BPj=BP2
FIND BUFFER POOL BPi with MAXIMUM VALUE of
PIi(SIZEi + 100), STEP 314
   PI1(1000+100) = 1.448152
   PI2(3000+100) = 0.589243
   PI1(1000+100) > PI2(3000+100), BP1 has the
      MAXIMUM value of PI => BPi=BP1
IS BPi = BPj, STEP 315
   BP1 = BP2 => NO
IS PIj(SIZEj-100) < PIi(SIZEi+100), STEP 316
   PI2(3000-100)=0.611328 < PI1(1000+100)=1.448152
   => YES
      Increase BPi by 100 buffers, STEP 320
         => SIZE1 = SIZE1 + 100 = 1100
      Decrease BPj by 100 buffers, STEP 322
         => SIZE2 = SIZE2 - 100 = 2900
CONTINUE = YES, so continue, STEP 311
   BP1 with SIZE1 = 1100, PI1(1100) = 1.48152
   BP2 with SIZE2 = 2900, PI2(2900) = 0.611328
FIND BUFFER POOL BPj with MINIMUM VALUE of
PIj(SIZEj - 100), STEP 312
   PI1(1100-100) = 1.499999, PI2(2900-100) =
      0.623280
   PI1(1100-100) > PI2(2900-100) ==> BPj= BP2
FIND BUFFER POOL BPi with MAXIMUM VALUE of
PIi(SIZEi + 100), STEP 314
   PI1(1100+100) = 1.402386, PI2(2900+100) =
      0.600000
   PI1(1100+100) > PI2(2900+100) ==>BPi= BP1
IS BPi = BPj, STEP 315
```

-continued

```
   BP1 = BP2 ==> NO
IS PIj(SIZEj-100) < PIi(SIZEi+100), STEP 316
   PI2(2900-100)=0.623280 < PI1(1100+100)=1.402386
   => YES
      INCREASE BPi by 100 buffers, STEP 320
         ==> SIZE1 = SIZE1 + 100 = 1200
      DECREASE BPj by 100 buffers, STEP 322
         ==> SIZE2 = SIZE2 - 100 = 2800
CONTINUE = YES, so continue, STEP 311
   BP1 with SIZE1 = 1200, PI1(1200) = 1.402386
   BP2 with SIZE2 = 2800, PI2(2800) = 0.623280
   BP1 continue with 1200, 1300, . . . , 2700
   BP2 continue with 2800, 2700, . . . , 1300
CONTINUE = YES, so continuem STEP 311
   BP1 with SIZE1 = 2700, PI1(2700) = 1.039651
   BP2 with SIZE2 = 1300, PI2(1300) = 0.951759
FIND BUFFER POOL BPj with MINIMUM VALUE OF
PIj(SIZEj - 100), STEP 312
   PI1(2700-100) = 1.054233, PI2(1300-100) =
      0.994732
   PI1(2700-100) > PI2(1300-100) ==> BPj=BP2
FIND BUFFER POOL BPi with MAXIMUM VALUE of
PIi(SIZEi + 100), STEP 134
   PI1(2700+100) = 1.025789, PI2(1300+100) =
      0.913629
   PI1(2700+100) > PI2(1300+100) ==> BPi=BP1
IS BPi = BPj, STEP 315
   BP1 = BP2 ==> NO
IS PIj(SIZEj-100) < PIi(SIZEi+100), STEP 316
   PI2(1200-100)=0.994732 < PI1(2700+100)=
      1.025789
   => YES
      Increase BPi by 100 buffers, STEP 320
         ==> SIZE1 = SIZE1 + 100
            = 2700 + 100 = 2800
      Decrease BPj by 100 buffers, STEP 322
         ==> SIZE2 = SIZE2 - 100
            = 1300 - 100 = 1200
CONTINUE = YES, so continue, STEP 311
   BP1 with SIZE1 = 2800, PI1(2800) = 1.025789
   BP2 with SIZE2 = 1200, PI2(1200) = 0.994732
FIND BUFFER POOL BPj with MINIMUM VALUE of
PIj(SIZEj - 100), STEP 312
   PI1(2800-100) = 1.039651, PI2(1200-100) =
      1.043651
   PI1(2800-100) < PI2(1200-100) ==> BPj= BP1
FIND BUFFER POOL BPi with MAXIMUM VALUE of
PIi(SIZEi + 100), STEP 314
   PIi(2800+100) = 1.012590, PI2(1200+100) =
      0.951759
   PI1(2800+100) > PI2(1200+100) ==> BPi=BP1
IS BPi = BPj, STEP 315
   BPI = BP1 ==> YES
      **** exit the LOOPING
SET CONTINUE = NO, STEP 318
GO TO STEP 311
   BP1 with SIZE1 = 2800, PI1(2800) = 1.025789
   BP2 with SIZE2 = 1200, PI2(1200) = 0.994732
FOR BUFFER POOL BP2
   SIZE2 = 1200 < OLD_SIZE_2 = 3000, STEP 324
      ==> CONTRACT BP2 by (3000-1200) =
         2800 BUFFERS, STEP 326
FOR BUFFER POOL BP1
   SIZE1 = 2800 > OLD_SIZE_1 = 1000, STEP 331
      ==> EXPAND BP1 by (2800-1000) =
         2800 BUFFERS, STEP 332
```

As described above, by expanding or contracting one or more servers (e.g., buffer pools) in a system in a manner consistent with the principles of the present invention, system performance may be enhanced. In one example, the technique of the present invention wakes up periodically and dynamically adjusts the buffer pool sizes and the number of resources allocated to the buffer pools in order to minimize the maximum performance index of the buffer pools and to balance the performance index among all the buffer pools.

Although a preferred embodiment has been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for managing allocation of resources in a computer system having a plurality of servers, each of said servers having a size value associated therewith, said method comprising:

(a) calculating a first performance index for each of said plurality of servers using its size value minus a predefined number of resources to be exchanged, such that a plurality of first performance indexes is provided;

(b) determining a minimum server by selecting from said plurality of first performance indexes a minimum performance index;

(c) calculating a second performance index for each of said plurality of servers using its size value plus said predefined number of resources to be exchanged, such that a plurality of second performance indexes is provided;

(d) determining a maximum server by selecting from said plurality of second performance indexes a maximum performance index;

(e) calculating a third performance index for said minimum server using its size value;

(f) calculating a fourth performance index for said maximum server using its size value;

(g) increasing the size value of the maximum server when a maximum value of said third and fourth performance indexes is greater than a maximum value of said minimum performance index and said maximum performance index;

(h) decreasing the size value of the minimum server when a maximum value of said third and fourth performance indexes is greater than a maximum value of said minimum performance index and said maximum performance index;

(i) repeating calculating step (a), determining step (b), calculating step (c), determining step (d), calculating steps (e) and (f), increasing step (g) and decreasing step (h) until a maximum value of said third and fourth performance indexes is not greater than a maximum value of said minimum performance index and said maximum performance index;

(j) removing resources from each of said plurality of servers having a decreased size value; and (k) adding resources to each of said plurality of servers having an increased size value.

2. The method of claim 1, wherein the resources to be added are those resources removed.

3. A resource allocation manager for managing allocation of resources in a computer system having a plurality of servers, each of said servers having a size value associated therewith, said resource allocation manager comprising:

means for calculating a first performance index for each of said plurality of servers using its size value minus a predefined number of resources to be exchanged, such that a plurality of first performance indexes is provided;

means for determining a minimum server by selecting from said plurality of first performance indexes a minimum performance index;

means for calculating a second performance index for each of said plurality of servers using its size value plus said predefined number of resources to be exchanged, such that a plurality of second performance indexes is provided;

means for determining a maximum server by selecting from said plurality of second performance indexes a maximum performance index;

means for calculating a third performance index for said minimum server using its size value;

means for calculating a fourth performance index for said maximum server using its size value;

means for increasing the size value of the maximum server when a maximum value of said third and fourth performance indexes is greater than a maximum value of said minimum performance index and said maximum performance index;

means for decreasing the size value of the minimum server when a maximum value of said third and fourth performance indexes is greater than a maximum value of said minimum performance index and said maximum performance index;

means for repeating calculating said first performance index, determining said minimum server, calculating said second performance index, determining said maximum server, calculating said third and fourth performance indexes, increasing said size value and decreasing said size value until a maximum value of said third and fourth performance indexes is not greater than a maximum value of said minimum performance index and said maximum performance index;

means for removing resources from each of said plurality of servers having a decreased size value; and means for adding resources to each of said plurality of servers having an increased size value.

4. The resource allocation manager of claim 3, wherein the resources to be added are those resources removed.

* * * * *